April 28, 1936.  J. H. HAMMOND, JR  2,038,996
SOUND SYNCHRONIZING SYSTEM
Filed Nov. 5, 1929  6 Sheets-Sheet 1

INVENTOR.
John Hays Hammond Jr.
BY Albert M. Austin
ATTORNEY.

Patented Apr. 28, 1936

2,038,996

UNITED STATES PATENT OFFICE 2,038,996

SOUND SYNCHRONIZING SYSTEM

John Hays Hammond, Jr., Gloucester, Mass.

Application November 5, 1929, Serial No. 404,889

1 Claim. (Cl. 84—4)

The invention relates to acoustic systems and more particularly to a system for recording a sound effect upon a record such as a roll for playing a musical instrument, and for reproducing the sound record synchronously with the performance of the record actuated instrument.

According to one form of the present invention a roll actuated instrument such as a piano or organ is played simultaneously with the performance of a sonorous effect. The tones of said sonorous effect are impressed upon a section of the playing roll and a photographic, phonographic record made thereof. The sonorous effect is then reproduced from said photographic record synchronously with the playing of the instrument.

Means are provided for selectively varying the volume of the sonorous effect during the course of its reproduction, independently of the intensity of the instrumental action.

Means are also provided whereby the volume of the reproduced sonorous effect can be automatically varied in accordance with the variation in intensity of the instrumental action.

According to a modification of the present invention the keys of a musical instrument are actuated so as to constitute a musical score. A record of the actuation of said keys is made upon an advancing roll. At the same time a separate sonorous effect such as a singing action is photographically recorded on a portion of said advancing roll. A reproducing record is obtained from said roll having perforations associated therewith corresponding to the actuation of the said keys. The instrumental action and the sonorous effect are then synchronously reproduced from said reproducing record. The tones of said reproduced sonorous effect and said instrumental action are amplified and regenerated. The regenerative means may constitute a part of radio receiving unit and may be disconnected from the reproducing system so as to permit the reception of a radio program by said unit.

The invention also provides for a novel and improved means for synchronizing a playing roll with a record upon which a visible or sonorous action has been previously recorded. According to this feature of the present invention means are provided for continuously feeding the record into reproducing positions. This record may take the form of a phonographic disc or may take the form of a motion picture film having a sound effect photographically recorded thereon.

An engaging member is provided which is driven in synchronism with said means and which is adapted to engage with the playing roll. One of the spools upon which this player roll is wound has a yieldable frictional engagement with a driving means so as to effect the advancement of the roll into successive performing positions.

The invention also consists in certain new and original features of construction and combinations of parts hereinafter set forth and claimed.

Although the novel features which are believed to be characteristic of this invention will be particularly pointed out in the claim appended hereto, the invention itself, as to its objects and advantages, the mode of its operation and the manner of its organization may be better understood by referring to the following description taken in connection with the accompanying drawings forming a part thereof, in which

Like reference characters denote like parts in the several figures of the drawings.

In the following description and in the claim parts will be identified by specific names for convenience, but they are intended to be as generic in their application to similar parts as the art will permit.

Figure 1:
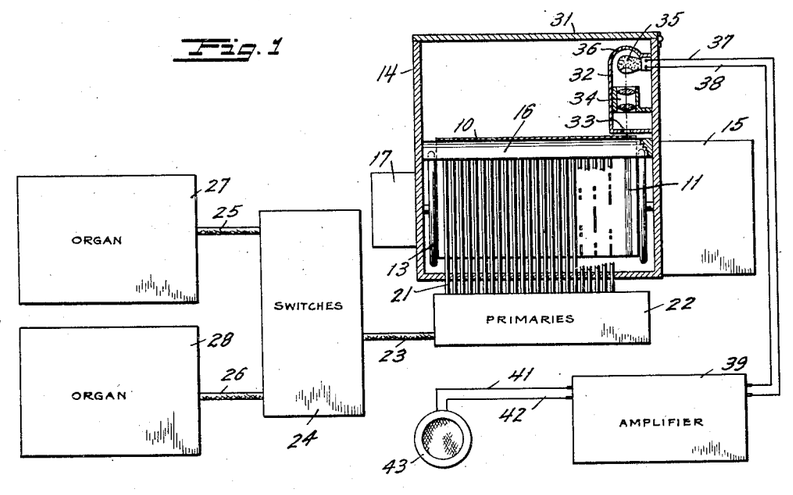
Fig. 1 is a diagrammatic view partly in section of one form of the recording mechanism used in this system.
Figure 2:
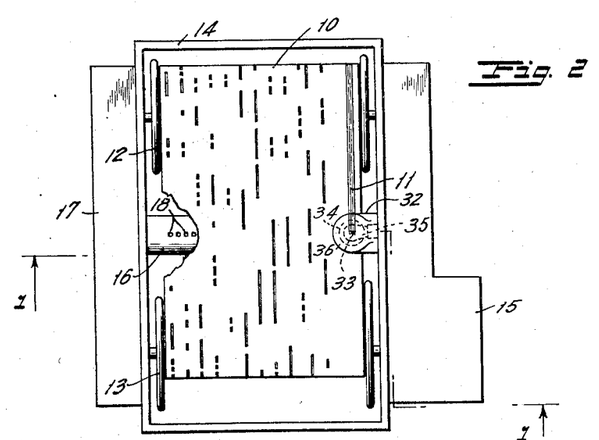
Fig. 2 is a front elevation of the player roll and photographic sound recording mechanism.

In the recording mechanism shown in Figs. 1 and 2, a roll 10 of celluloid or other suitable transparent material is first punched by any well known method according to the notes of a given piece of music. The edge of this roll is then treated by the application of a suitable photographic material, thereby forming a narrow sensitized strip 11 along the right hand edge of this roll as viewed in Fig. 2. This roll 10 is then wound on the spools 12 and 13 which are mounted in a frame 14. The spool 13 is driven by any well known form of motor, which is housed in a casing 15. The celluloid roll 10 is passed over a tracker bar 16 and is held in the proper position with respect to this tracker bar by means of a suitable tracking mechanism enclosed in the casing 17.

The tracker bar 16 is provided with a plurality of holes 18 connecting with an equal number of tubes 21 which are in communication with a set of primary pneumatics 22. The tracker bar and primaries may be of any suitable construction and may take the form similar to those shown at 160 and 162 respectively in Figs. 3 and 4 of the United States Patent #1,722,977. The primaries 22 are connected by a cable 23 to a switching mechanism 24. This cable and switching mechanism may be of any standard construction and may correspond to the cable formed by the wires 52, 53 and 54 and the switching mechanism shown at 27 in Fig. 2 of United States Patent #1,702,773. The switching mechanism 24 is connected by two cables 25 and 26 to two organs 27 and 28 which may also be of any standard or well known construction.

The casing 14 is provided with a door 31 which is impervious to light so that the whole apparatus inside of this casing is protected from any external light influences. On the right hand wall of the casing 14 is mounted a light proof box 32 which is provided with a small horizontal slit 33 located opposite the phonographic strip of sensitized material 11. Inside the box 32 is mounted a condensing lens system 34, a source of variable illumination 35, and a reflector 36, behind said lamp 35. The variable intensity lamp 35 is connected by conductors 37 and 38 to the output side of an amplifier 39. The input side of this amplifier is connected by two conductors 41 and 42 to a microphone 43.

In making a record, the roll 10, which has already been punched according to a desired piece of music, is wound on the spools 12 and 13 and is placed in the casing 14 so that it passes over the tracker bar 16. The sensitized strip 11 will then be disposed under the box 32 and in front of the slit 33. All of this operation is performed in a dim illumination so as not to affect the sensitized portion of the film. The door 31 is then closed and the motor of the casing 14 started up and run at a constant speed by any well known means.

The roll 10 will then be uniformly advanced and as the perforations in this roll come opposite the corresponding holes 18 in the tracker bar 16, the primaries 22 will be operated in the well known manner for causing the organs 27 and 28 to play according to the music cut on the roll 10. At the same time that the organ is played a singer will sing in front of the microphone 43. The current produced thereby will be amplified through the agency of amplifier 39, and then impressed upon the variable intensity lamp 35.

The variable light from this lamp will then be focused by the condensing lens 34 through the small slit 33 on to the sensitized strip 11. As this strip 11 is advanced at a uniform speed past the slit the photographic record of the singer's voice will be imprinted on the strip. It should be noted that this record is being effected during the accompaniment of the organs.

A condensing lens system 34 has been shown which may be used in cases where the sensitized strip 11 is fed at slow speeds. In such cases a lens system as shown is provided which will focus the light on the strip into concentrated bands. This will effect a more distinct sound record by eliminating the overlapping of the records of the successive pulsations of the light rays emanating from the lamp 35. In some cases the speed with which the sensitized strip 11 is fed may be so low as to necessitate the use of a microscopic lens system for focusing the light up on the strip in microscopic bands.

After the selection has been played the roll 10 is removed from the casing 14 and the photographic strip 11 is developed by any well known photographic means. From this negative any number of positive prints may be made having impressed thereon a record of the voice of the singer. This record will be in the form of a narrow strip running near the right hand edge of the roll. Along the edges of this record the roll may be made black forming two strips of black on either side of the sound record. These rolls are then ready to be used in the reproducing mechanism described below.

Figures 3, 4:
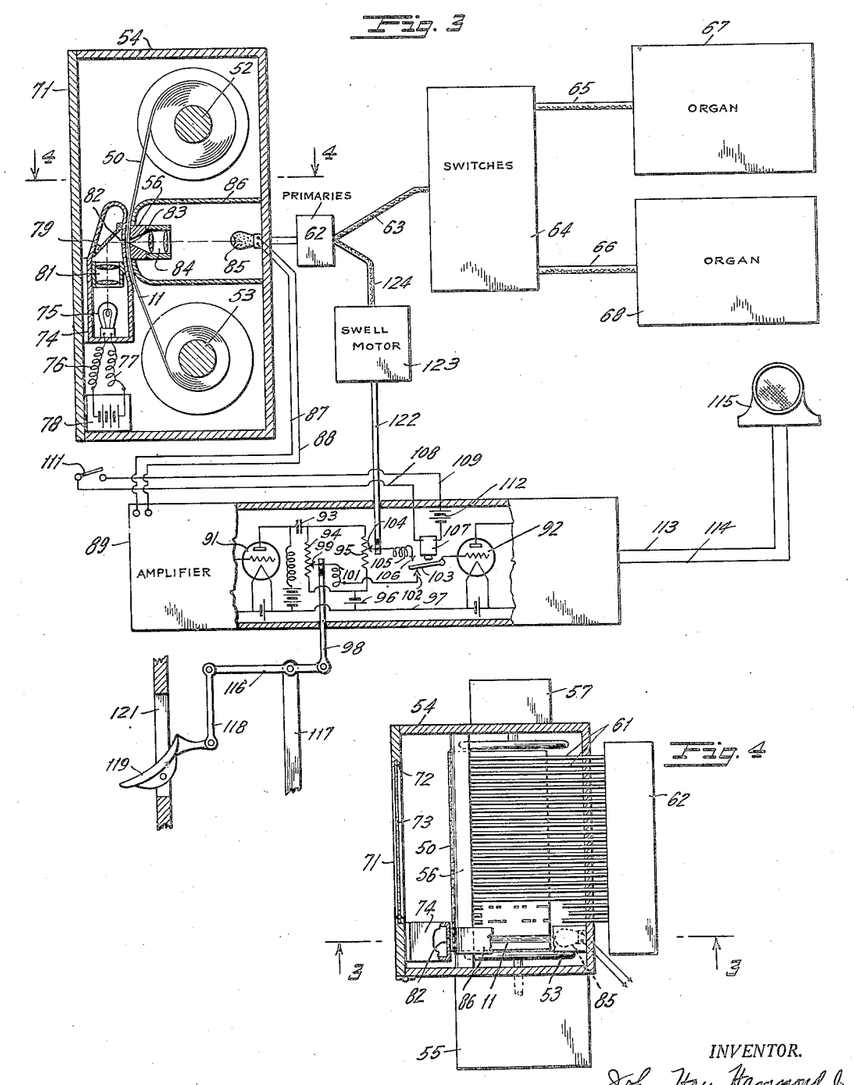
Fig. 3 is a sectional plan view of the reproducing system taken on line 3—3 of Fig. 4.
Fig. 4 is a diagrammatic view partly in section taken on line 4—4 of Fig. 3.

In the player and reproducing mechanism shown in Figs. 3 and 4 the positive films 50 are wound upon two spools 52 and 53 which are supported in a casing 54. These spools are driven by a motor located in casing 55 which is similar to the motor in the casing 15. A tracker bar 56 is mounted in the casing 54 and a tracking mechanism is located in the casing 57 which is similar to the tracking mechanism in the casing 17. The tracker bar 56 is provided with a plurality of holes similar to the holes 18 which are connected to an equal number of tubes 61. These are connected to primaries 62. All but a few of these primaries are connected by a cable 63 to a switching mechanism 64 which is connected by two cables 65 and 66 to two organs 67 and 68. These primaries with its associated switching mechanism are similar in construction to those described with reference to the recording assembly.

The casing 54 has mounted thereon a hinged door 71 which has an opening 72 provided with a sheet of glass 73. Secured to the back of this door is a housing 74 in which is mounted a source of constant illumination 75 connected by flexible conductors 76 and 77 to a source of power such as a battery 78. Mounted inside the housing 74 and disposed near the top thereof as viewed in Fig. 3 is an inclined mirror or other reflecting surface 79. Between this and the lamp 75 is mounted a lens system 81, similar to the lens system 34 in the recording system. This lens system 81 focuses the light from the lamp 75 through a small horizontal slit 82 in the casing 74 and upon the strip 11.

Located directly in the tracker bar 56 back of the slit 82 is a hole 83. Behind this hole is mounted a suitable lens system 84 for focusing upon a photo-electric cell into a magnified area the light coming through the hole. This cell is located in a light proof casing 86 which is attached to the tracker bar 56 and which is mounted in the casing 54. The photoelectric cell 85 is connected by two conductors 87 and 88 to the input of an amplifier 89. Two vacuum tubes of this amplifier are shown at 91 and 92. The plate of the tube 91 is connected through a condenser 93 to two resistances 94 and 95, the other sides of which are connected through a battery 96 to a conductor 97 which is connected to the filaments of the two tubes 91 and 92. Mounted on a sliding rod 98 is a contact 99 which is connected by a flexible conductor 101 to a contact point 102 located adjacent to a switch 103. Sliding on the resistance 95 is a contact 104 which is connected by a flexible conductor 105 to a contact 106 located adjacent to the switch 103. The switch 103 is connected to the grid of the tube 92, and has located adjacent thereto an electro-magnet 107 which is connected by two conductors 108 and 109 to a switch 111. In the conductor 109 there is a battery 112. The output circuit of the amplifier 89 is connected by two conductors 113 and 114 to a loud speaker 115.

The lower end of the rod 98 is connected to one end of the lever 116 which is pivoted to the frame at 117. The other end of the lever 116 is connected by a link 118 to a swell pedal 119 which is pivoted to the frame of the player mechanism 121. The contact 104 is carried by a rod 122 which is operated by a small suitable swell motor 123. This swell motor may be similar in construction to that shown at 210 in Figs. 5 and 6, United States Patent No. 1,722,977. The magnets of this swell motor 123 are connected by cable 124 to those primaries 62 which were not connected to the switching mechanism 64. These primaries are controlled by a small group of holes in the tracker bar, which are not used for playing the organ.

In the operation of the playing and reproducing mechanism shown in Figs. 3 and 4 the positive film roll 50 is placed on the spools 52 and 53; and the door 71 is closed thus bringing the housing 74 in close proximity to the roll 50. The motor in the casing 55 is then started and run at a constant speed by any well known means. The light 75 is then turned on. As the roll 50 passes over the tracker bar 56 the perforations in this roll will uncover the holes in the tracker bar and thus operate the primaries 62. This in turn will cause the organs 67 and 68 to be played in the usual way. At the same time the light from the lamp 75 is focused by means of the lens system 81 and the mirror 79 upon the photographic record of the roll 50. This light after passing through this record and the hole 83 is focused by the lens 84 onto the photoelectric cell 85. As the record advances in front of the hole 83 the light rays passing therethrough will be altered and fluctuated in accordance with the opacity of the record. These fluctuated rays will be impressed upon the photoelectric cell 85 and translated thereby into corresponding current fluctuations. These current fluctuations are amplified by the amplifier 89 and impressed upon a sound propagating device such as the loud speaker 115 so as to reproduce the original voice of the singer. This voice will be accompanied by the playing of the organ thereby reproducing the music and accompaniments exactly as effected at the time the record was made.

If it is desired to vary the intensity of the singer's voice the swell pedal 119 may be rotated, thus moving rod 98 up or down to increase or decrease the intensity of the tones produced by the loud speaker 115. If it is desired to have this variation of intensity produced automatically in accordance with the variations in intensity of the organ action the switch 111 is closed thereby energizing the magnet 107 which causes the switch 103 to move upward. This operation effects the disengagement of the contact 102 and the engagement of the contact 106. The perforations in the roll 50 which come opposite the holes controlling the swell motor 123 will then cause this motor to take up any desired position depending upon the number of perforations employed. This part of the apparatus is of well known construction and need not be fully described herein. As the rod 122 moves up and down the intensity of the tone produced by the loud speaker 115 will be increased or decreased automatically.

Figure 5:
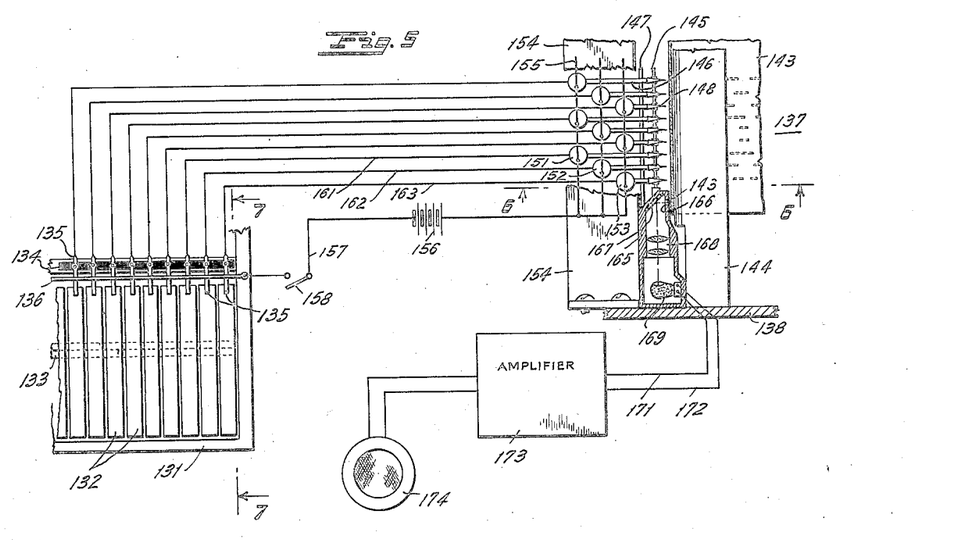
Fig. 5 is a diagrammatic view partly in section of a modified form of the recording mechanism used in this system.
Figure 6:
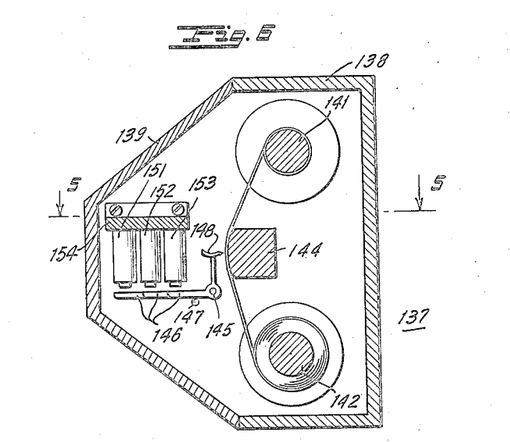
Fig. 6 is a section taken on line 6—6 of Fig. 5.
Figure 7:
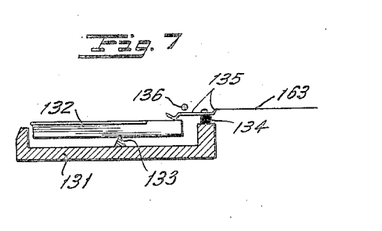
Fig. 7 is a section taken on line 7—7 of Fig. 5.

In Figs. 5, 6 and 7 there is shown a recording apparatus for use in connection with a piano. The frame work of the piano is shown at 131 and the keys at 132. These keys are pivotally mounted on the apex of a triangular shaped bar 133. Mounted on a strip of insulation 134 which is secured to the frame of the piano is a plurality of contact springs 135. Mounted above these springs but separated from them is a longitudinal bar 136 of conducting material.

For recording the notes played on the piano a recorder 137 is provided which consists of a casing 138 provided with a removable cover 139. Mounted in this casing are two spools 141 and 142 upon which is wound a roll 143 of transparent material such as celluloid. The spools 141 and 142 are driven by the usual air motor used in the ordinary player piano action. The roll 143 passes over a bar 144. In front of this bar and pivotally mounted on a rod 145 is a plurality of L shaped members 146. These members normally rest against a second rod 147. Each one of these members is provided with a suitable marking device 148, such as an inking pen. Located adjacent to the other ends of the members 146 which are made of magnetic material is a plurality of electro-magnets 151, 152 and 153. These magnets are supported by a bracket 154 which is secured to the casing 138. One side of the windings of these magnets is connected to a common conductor 155 which is connected to one side of a battery 156 the other side of which is connected by a conductor 157 through a switch 158 to the rod 136. The other sides of the windings of the electromagnets 151, 152, and 153 etc., are connected by conductors 161, 162, and 163 etc., to the corresponding contacts 135.

One edge of the roll 143 is coated with a sensitive photograph emulsion. Mounted adjacent this edge is a casing 165 which is provided with a small slit 166. This slit is exposed to the sensitized part of the roll 143. Mounted in the casing 165 is an inclined mirror 167, a condensing lens system 168 similar to the lens system 34 shown in connection with Fig. 1, and a source of variable illumination 169. These are so arranged that the light from the lamp 169 will be focused on the slit 166. The lamp 169 is connected by two conductors 171 and 172 to an amplifier 173 which is connected to a microphone 174.

In the operation of the recording mechanism shown in Figs. 5, 6 and 7 the roll 143 with the sinsitized edge is placed on the spools 141 and 142 and is fed over the bar 144 at a uniform speed. At the same time a singer sings into the microphone 174 and a pianist accompanies him on the piano 131. The voice of the singer will be amplified by the amplifier 173 which will cause the lamp 169 to vary in intensity corresponding to the voice of the singer. As the pianist depresses the keys 132 the corresponding contact 135 will be elevated engaging the rod 136. This will close the circuit through the corresponding magnet in the recorder 137 which will cause the corresponding marker 148 to be pressed against the moving roll 143 thus making a mark on this roll. This mark continues until the key is released at which time the electromagnet becomes deenergized and the corresponding member 146 drops out of engagement with the roll 143.

In this way a record is made simultaneously of the singer's voice and the playing of the piano. The record is then developed by any suitable photographic process and printed on any number of positive rolls. The holes in these rolls are then punched corresponding to the marks on the roll 143 so that the rolls will have a positive photographic record of the singer's voice together with the proper perforations to cause a player piano to reproduce the notes played by the pianist.

Figure 8:
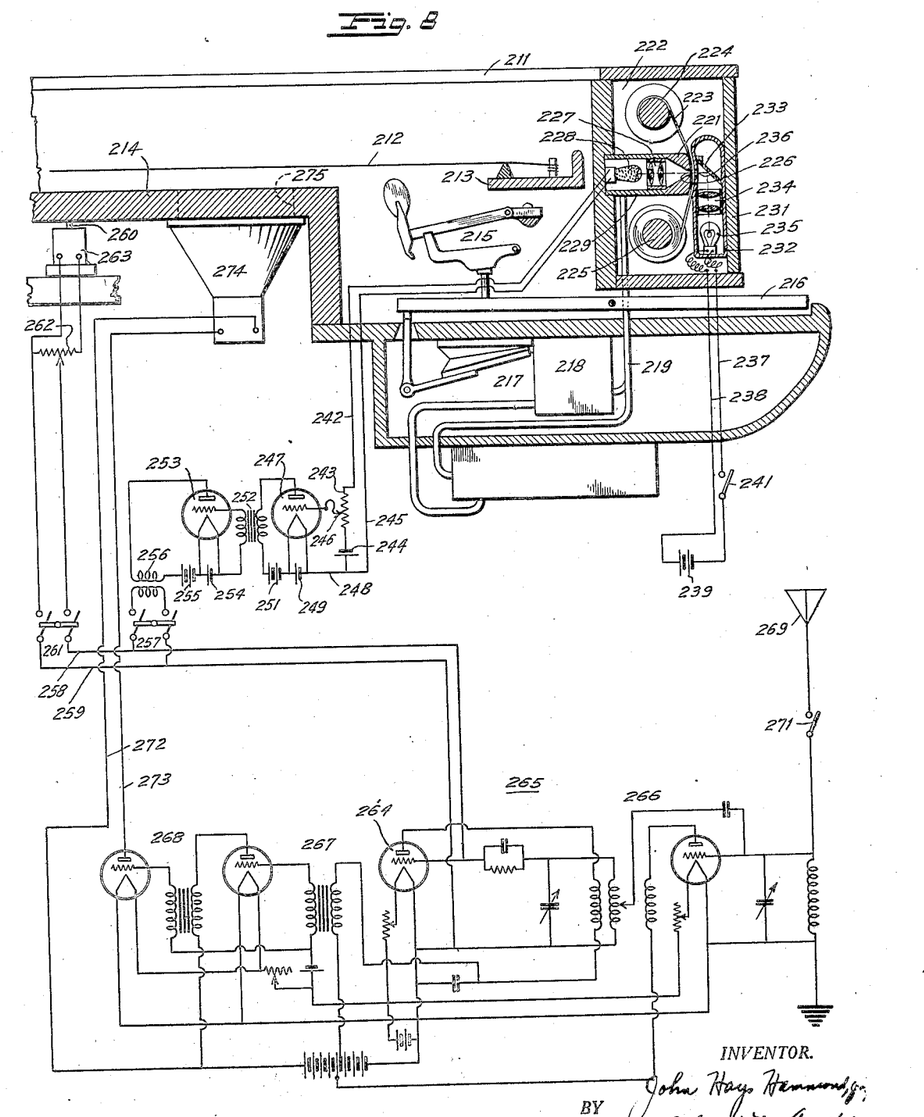
Fig. 8 is a diagrammatic view partly in section of a modified form of reproducing system.

As shown in Fig. 8, the player piano 211 is provided with the usual strings 212 mounted on the frame 213 and a sounding board 214. Located adjacent to the strings 212 is the usual piano action 215, which is operated either by a key 216 or a pneumatic 217. This pneumatic is controlled by a suitable primary mechanism 218 which may be similar in construction to the primary shown at 101 in Fig. 4 of United States Patent #1,713,124. These pneumatics are connected by tubes 219 to a tracker bar 221 located in a casing 222. Passing over this tracker bar is a roll 223 of celluloid or other suitable transparent material which is provided with perforations for playing the piano in the usual way and along the edge of which is a sound record of a voice or an instrument. The roll 223 is wound upon two spools 224 and 225 which are mounted in the casing 222 and which are driven by the usual pneumatic motor employed in this type of piano. In the tracker bar 221 directly behind the sound record on the roll 223 is a small slit 226. Back of this slit is mounted a suitable lens system 227 for magnifying the altered rays passing therethrough and at the focus of these lens is located a photoelectric cell 228, which is enclosed by a lightproof casing 229. The front of the casing 222 is provided with a door 231 in which may be mounted a sheet of glass so as to expose the interior of said casing to full view. On this door is secured a lightproof casing 232 in which is mounted an inclined mirror 233. Also mounted in this casing 232 is a source of illumination 235 and a condensing lens system 234 similar to the lens system 168. The location of the lamp 235, the lens system 234 and the mirror 233 are set so that the light from lamp 235 is focused in concentrated bands upon a narrow strip 236 provided in the casing 232.

This slit is located in registered position with the slit 226 in the tracker bar 221. The lamp 235 is connected by two conductors 237 and 238 to a battery 239. A switch 241 is inserted in the line 237.

The photoelectric cell 228 is connected by a conductor 242 to a resistance 243; the other side of which is connected to a battery 244. The other side of this battery is connected by a conductor 245 to the photoelectric cell 228. An adjustable contact 246 is slidably mounted on the resistance 243 and is connected to the grid of a vacuum tube 247. One side of the filament of this tube is connected by conductor 248 to the conductor 245. The filament is heated by a battery 249. The other side of the filament is connected through a battery 251 and the primary of a transformer 252 to the plate of the tube 247. One side of the secondary of the transformer 252 is connected to the grid of a vacuum tube 253, the filament of which is connected to the other side of the secondary of the transformer 252. The filament of the tube 253 is heated by a battery 254. The other side of this filament is connected through a battery 255 and the primary of a transformer 256 to the plate of the tube 253. The secondary of this transformer is connected through a switch 257 to two conductors 258 and 259. These conductors are connected through a switch 261 to a potentiometer 262, the other side of which is connected to an electromagnetic pick up device 263, the armature 260 of which is connected to the sound board 214.

The conductors 258 and 259 are connected to the grid and filament respectively of a detector tube 264 which forms part of a standard radio receiving set 265.

In a particular type of radio receiving unit which is well known in the art has been shown for purposes of illustration but it is obvious that any suitable type of radio receiver may be used for this purpose. In the receiver 265 one stage of the radio amplification is shown at 266 and two stages of audio amplification at 267 and 268. The antenna is indicated at 269 and a switch in the antenna circuit at 271. The output of the receiver 265 is connected by two conductors 272 and 273 to a loud speaker 274 secured to the under side of the sound board 214. A hole 275 is provided in this sound board directly above the loud speaker 274.

As the roll 273 is moved across the tracker bar 221 in the usual manner the notes of the piece will be played by the piano, the operation being the same as that of any standard player piano mechanism. As the sound record on the roll 223 passes in front of the slit 226 in the tracker bar 221 the light from the lamp 235 will pass through the sound record on the film and the intensity of the light transmitted will vary according to the opacity of this record. This variable light will then be focused by the lens 227 upon the photoelectric cell 228. The current from the cell will be amplified by the two stages of amplification associated with the tubes 247 and 253. The amplified current will then pass through the switch 257 and over the conductors 258 and 259 to the detector tube 264 of the radio receiver 265. The voice current will then be amplified by the two stages of amplification 267 and 268 and fed over the conductors 272 and 273 to the loud speaker 274 where the voice will be reproduced. In this way the piano acts as an accompaniment to the singing.

If it is desired to regenerate the tones from the sound board the switch 261 is closed. The electro-magnetic pick up 263 then picks up the vibrations of the sound board 214. The output of this pick up device will then be fed over conductors 258 and 259 to the detector tube 264, and will be amplified by the two stages of audio frequency amplification 267 and 268. In this way the tones of the sound board will be regenerated thus increasing the volume of tone produced by the piano and by the phonograph apparatus. The relative intensity of the voice may be varied by manipulating the contact 246, the control for which may be located under the keyboard and the intensity of regeneration may be controlled by varying the potentiometer 262, the control for which can be located under the keyboard. The switch 257 and 241 may be so connected that when the switch 257 is opened the switch 241 is also opened thereby turning off the lamp 235 when the sound record on the roll is not being used. The switches 241, 257 and 261 may be located at any convenient point under the keyboard.

If it is desired to obtain a radio broadcast program the switches 241 and 257 are opened and the switch 271 is closed thereby connecting the antenna 269 to the radio receiving set 265. In this way the broadcast program may be received on the antenna and amplified by the receiver 265 and then fed to the loud speaker 274. This program can be regenerated by closing the switch 261 if desired.

Figure 9:
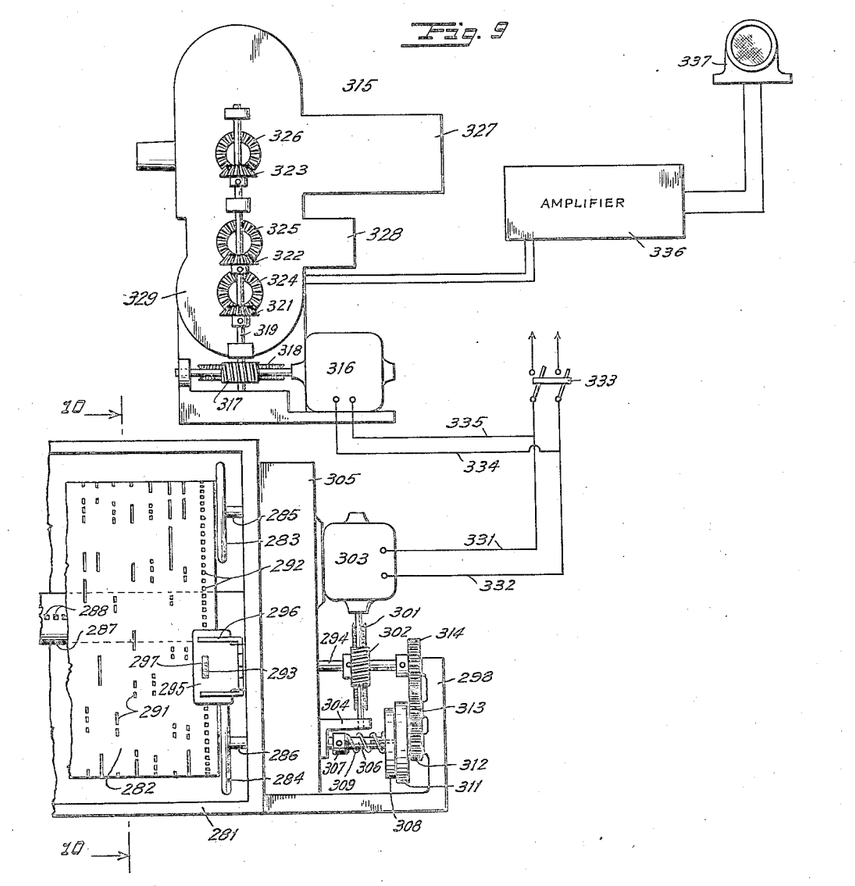
Fig. 9 is a diagrammatic view of a system for synchronizing a record with a playing roll.
Figure 10:
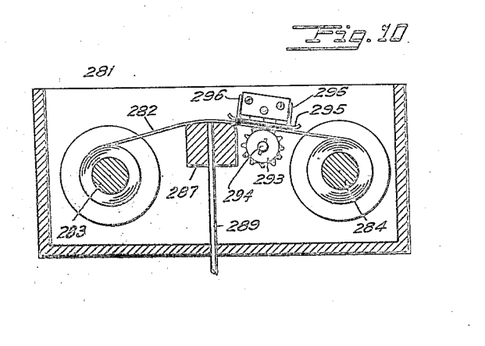
Fig. 10 is a section taken on line 10—10 of Fig. 9.

In the form of the invention shown in Figs. 9 and 10, a player piano mechanism is mounted in a casing 281. This mechanism consists of a roll of perforated material 282 which may be of celluloid or other material which will not tear easily. This roll is wound upon two spools 283 and 284 mounted upon two shafts 285 and 286 which are journalled in the casing 281. The roll 282 passes over a tracker bar 287 which is provided with the usual holes 288 connected by tubes 289 to any standard form of player piano mechanism.

The roll 282 is provided with the usual perforations 291 for playing the desired music and also with a set of perforations 292 along one edge. These perforations are engaged by the teeth of a roll engaging member such as sprocket wheel 293 which is carried on the end of a shaft 294. This shaft is journalled in the casing 281. A hinged flap 295 is carried by the side of the casing 281 and is normally pressed against the roll 282 by means of springs 296. This flap is provided with an opening 297 through which the teeth of the sprocket wheel pass when it is rotated. The outer end of the shaft 294 is journalled in a bracket 298. Secured to the shaft 294 is a worm wheel 301 which meshes with a worm 302 carried on the shaft of a synchronous motor 303. The other end of this shaft is journalled in a bracket 304.

The usual driving and reversing mechanism for the roll 282 is contained in a casing 305. The driving shaft 306 for this mechanism is journalled at its outer end in the bracket 298 and has pinned to it a collar 307. Keyed to this shaft but slidably mounted thereon is a disk 308 between which and the collar 307 is a coiled spring 309. Loosely mounted on the shaft 306 is a second disk to which is secured a pinion 312. This pinion meshes with the idler pinion 313 mounted for rotation on a stud carried by the bracket 298. The idler pinion 313 meshes with the gear 314 secured to the shaft 294.

The projector mechanism 315 may be of any well known standard construction and is provided with a synchronous motor 316 for the purpose of driving it. To the shaft of this motor is secured a worm 317 which meshes with the worm wheel 318 secured to a shaft 319. This shaft is pinned to three bevelled gears 321, 322 and 323 which mesh with three other bevelled gears 324, 325, and 326 respectively. The gear 326 is used for driving the standard projector mechanism for showing the film on a suitable screen. This film is illuminated by a lamp contained in the casing 327. The gear 325 is used for driving the film by the sound reproducing mechanism which includes a lamp contained in the casing 328 and a photoelectric cell in the casing 329. The gear 324 is used for winding up the film on the take-up roll through the usual friction clutch mechanism. All this apparatus is of well known and standard construction and need not be more fully described herein.

The motor 303 of the player mechanism is connected by two conductors 331 and 332 to a switch 333; the other side of which is connected to any suitable source of alternating current supply. The motor 316 of the projector mechanism is connected by two conductors 334 and 335 to the conductors 332 and 331 respectively, and thence through the switch 333 to the same alternating current supply. The photoelectric cell in the casing 329 is connected to an amplifier 336 the out-put of which is connected to a loud speaker 337.

In the operation of the form of the invention shown in Figs. 9 and 10, the roll 282 is placed on the spools 283 and 284, while the flap 295 is being held away from the roll. The roll is then positioned so that a zero mark on the roll comes opposite the holes 288 in the tracker bar. The perforations 292 are then fitted over the teeth of the sprocket wheel 293 and the flap 295 is allowed to drop down upon the roll 282, thus holding this roll in engagement with the sprocket wheel 293. The film is then placed in the projector 315 in the usual manner and is set at a zero position as marked on the film. The switch 333 is then closed thus starting the two synchronous motors 303 and 316 which will run at exactly the same speed. The motor 316 by means of the worm and wheel 317—318 will cause a rotation of gears 324, 325, and 326 which will cause a motion picture of the singer to be projected on the screen and at the same time will cause the sound record of the film to reproduce the voice of the singer by means of the photoelectric cell in the casing 329, the amplifier 336 and the loud speaker 337. At the same time, the motor 303 will drive the shaft 294 by means of the worm and wheel 302 and 301, thereby causing the sprocket wheel 293, to rotate synchronously with the advancement of the film.

The shaft 294 when it is rotated will cause a rotation of the disk 311 by means of the gear 314 and pinions 313 and 312. This disk will cause the disk 308 to be rotated by means of the friction between the two disks, thereby rotating the spool 284. This causes the roll to be fed downward as viewed in Fig. 9. The gears 314 and pinions 313 and 312 are of a size, which will tend to advance the roll, at a linear speed which is greater than the peripheral speed of the wheel 293. However the roll 282 cannot travel any faster than the sprocket wheel 293 will permit, so that there will be slippage between the disks 311 and 308 and a corresponding adjustment in the rotational speed of the spool 284. In this way the playing of the piano, the voice of the singer, and the motion picture will be kept exactly in synchronism.

Figure 11:
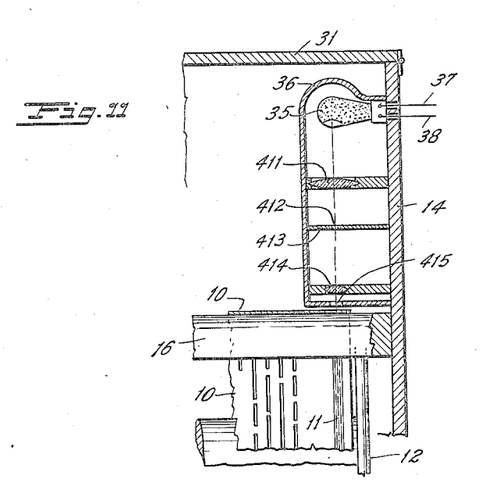
Fig. 11 shows a modified form of recording means.

Fig. 11 shows a modified form of recording means similar to that shown in Fig. 1. In this modified form, the variable light from the lamp 35 passes through a lens 411 and thence through a narrow slit 412 in a diaphragm 413. The light then passes through a small lens 414 and through an aperture 415 in the casing 36. In this way an extremely fine and distinct image of the slit 412 is made upon the roll 10. It is thus possible to focus the light from the lamp 35 on to a small area on the roll 10 thereby compensating for the relatively slow speed of this roll. The diaphragm 413 may also be mounted between the lens 411 and the lamp 435.

Figure 12:
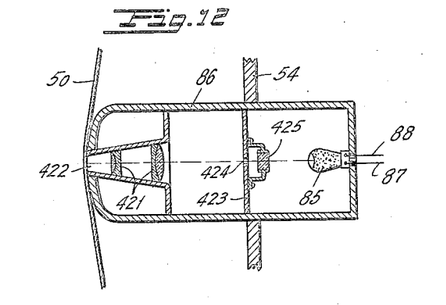
Figs. 12 to 14 show various modified forms of reproducing mechanism.
Figure 13:
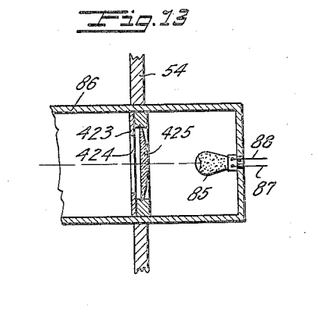

In Figs. 12 and 13 is shown a modified form of reproducing mechanism which can replace that shown in Figs. 3 and 8. In this form a system of lenses 421 is mounted behind the roll 50 between which and the lens system is a comparatively large opening 422. The light from the lamp 75 passes through the roll 50 as described in connection with Fig. 3. The lens system 421 then forms an enlarged image of the sound record on a diaphragm 423 which is provided with a narrow slit 424. Behind this slit is mounted a cylindrical lens 425 which focuses the light which passes through the slit 424 upon the photoelectric cell 85. In this way light from a very narrow strip of the sound record will be allowed to pass through the slit 424 and on to the photoelectric cell 85, thus producing a very clear reproduction of the sound.

Figure 14:
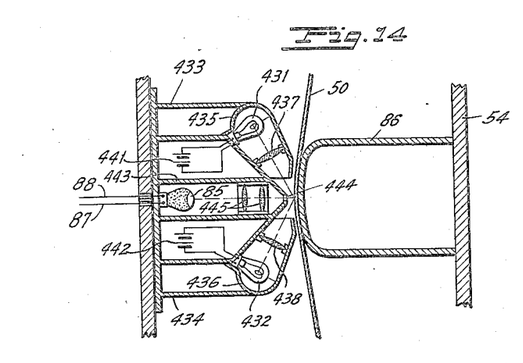

In Fig. 14 is shown a modified system of reproduction using reflected light from the sound record instead of transmitted light. In this form two lamps 431 and 432 are mounted in two cases 433 and 434. Behind these lamps are two reflectors 435 and 436 and in front of them are two lenses 437 and 438 which focus the light from these lamps upon the sound record on the roll 50. These lamps are supplied with current from two batteries 441 and 442. Mounted between the two casings 433 and 434 is a third casing 443 which is provided at one end with a narrow slit 444 behind which is mounted a lens system 445 which focuses the light reflected from the sound record on to the photoelectric cell 85.

In the operation of this form of the invention the light from the lamps 431 and 432 constantly illuminates the sound record on the roll 50. The light reflected from this record then passes through the slit 444 and is focused by the lens system 445 on to the photoelectric cell 85, which is connected to the amplifier as described in connection with Fig. 3.

While certain novel features of the invention have been shown and described and are pointed out in the annexed claim, it will be understood that various omissions, substitutions and changes in the forms and details of the device illustrated and in its operation may be made by those skilled in the art without departing from the spirit of the invention.

What is claimed is:

A device for reproducing with instrumental accompaniment a sonorous effect previously recorded, which comprises an instrument playing roll having phonographically recorded thereon a sonorous effect along a portion thereof, an instrument adapted to be played in response to the actuation of said playing roll and having a member actuated by said roll to vary the intensity of the reproduced musical action, means including a transmission channel having a volume control for reproducing said sonorous effect from said phonographically recorded portion simultaneously with the performance of the instrument, and means actuated by said member for automatically varying said volume control so as to automatically vary the intensity of the sonorous effect in accordance with the variation in intensity of the reproduced instrumental action.

JOHN HAYS HAMMOND, Jr.